E. H. McCLOUD.
AUTOMATIC FIRE RESISTING SHUTTER.
APPLICATION FILED FEB. 19, 1912.
Reissued Apr. 16, 1912.
13,405.
2 SHEETS—SHEET 1.
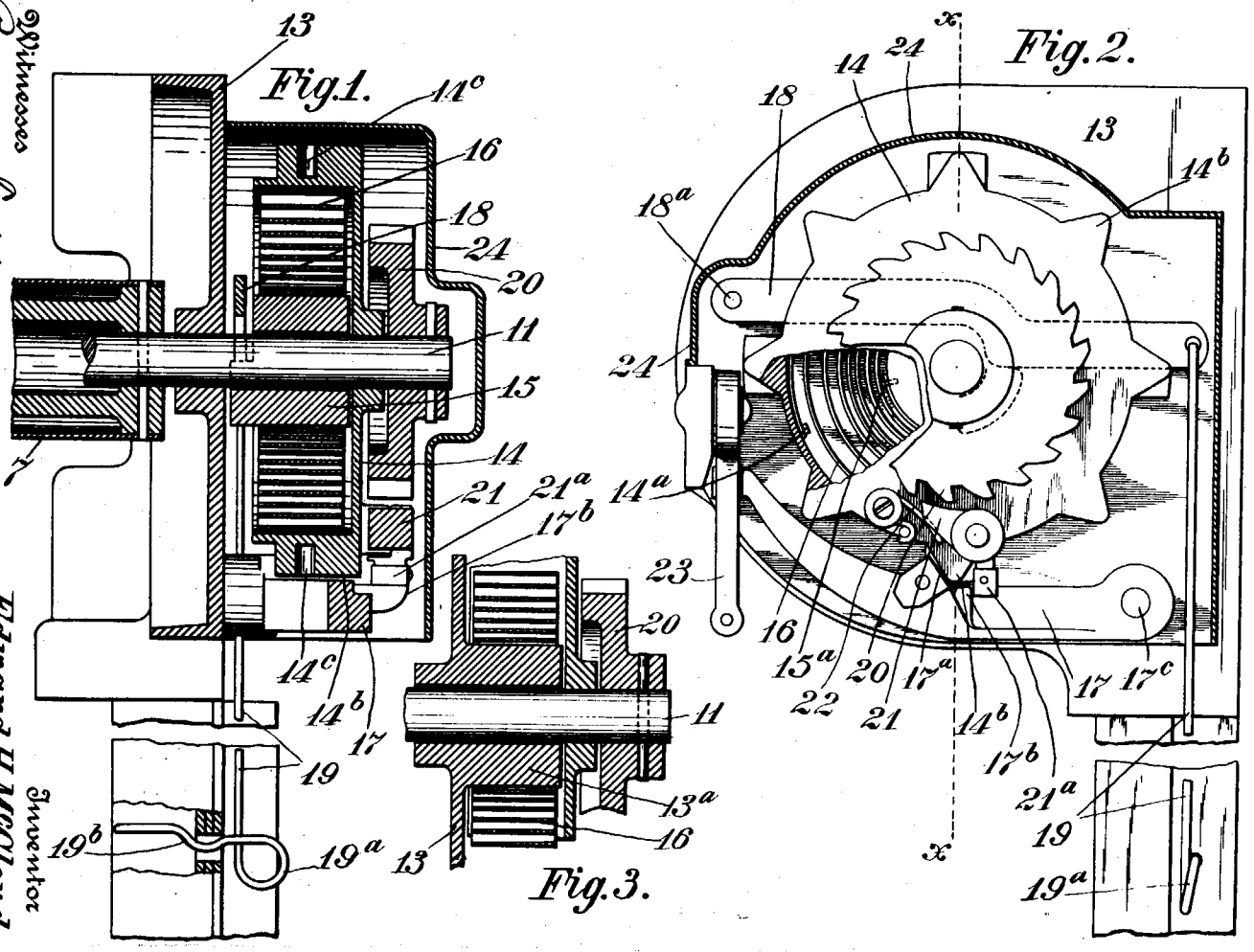
Witnesses
Benjamin Finckel
Donald W. Kling.
Inventor
Edward H. McCloud
by Finckel & Finckel
his Attorneys E. H. McCLOUD.
AUTOMATIC FIRE RESISTING SHUTTER.
APPLICATION FILED FEB. 19, 1912.
Reissued Apr. 16, 1912.
13,405.
2 SHEETS—SHEET 2.
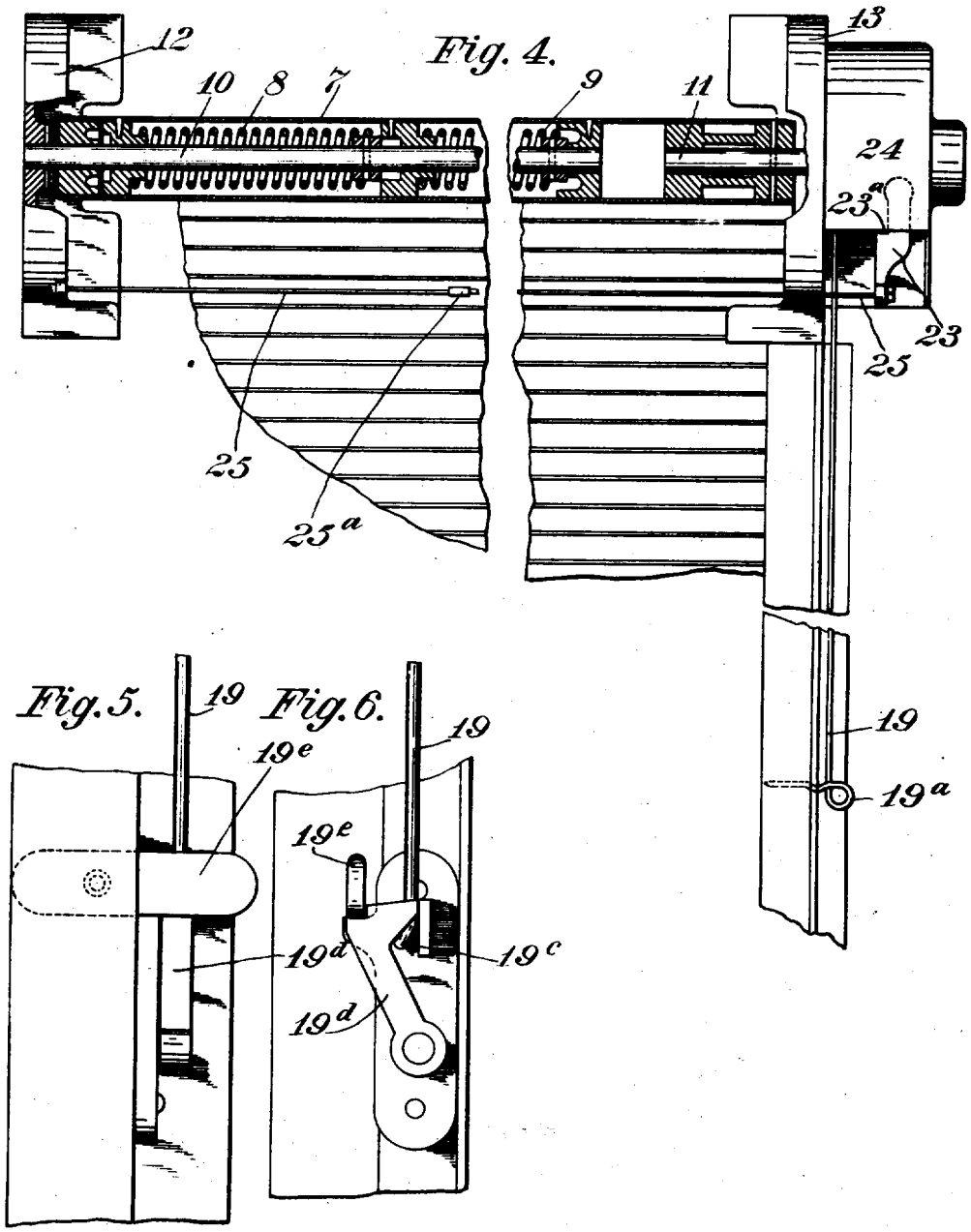
Witnesses
Benjamin Finckel
Donald W. Illing
Inventor
Edward H. McCloud
by Finnegan & Finnegan
his Attorneys

UNITED STATES PATENT OFFICE.

EDWARD H. McCLOUD, OF COLUMBUS, OHIO.

AUTOMATIC FIRE-RESISTING SHUTTER.

13,405. Specification of Reissued Letters Patent. Reissued Apr. 16, 1912.

Original No. 987,154, dated March 21, 1911, Serial No. 407,743. Application for reissue filed February 19, 1912. Serial No. 678,734.

*To all whom it may concern:*

Be it known that I, EDWARD H. McCLOUD, a citizen of the United States, residing at Columbus, in the county of Franklin and State of Ohio, have invented a certain new and useful Improvement in Automatic Fire-Resisting Shutters, of which the following is a specification.

The chief object of the invention is to combine with a so-called counterbalanced fire-resisting rolling shutter or curtain, improved means adapted to be rendered automatically operative in case of near-by fire, to impel the shutter or curtain to closed position.

The invention consists in the construction and combination of parts hereinafter described and claimed, the invention not being confined in its practical embodiment to the forms of the parts shown.

In the accompanying drawings—Figure 1 is a vertical section on the line $x$—$x$, Fig. 2, showing the shutter-closing devices; Fig. 2 is an elevation and section with parts broken out, looking toward that end of the shutter containing the shutter-closing devices; Fig. 3 is a sectional detail of the kind shown in Fig. 1 but illustrating a modification; Fig. 4 is a fragmentary elevation and section looking from the exterior of a building and illustrating a shutter containing the invention; Figs. 5 and 6 are front and side views, respectively, illustrating a modification of the device for releasing the spring of the curtain-closing devices.

The curtain roller 7 shown is of the now well-known counterbalancing kind, that is to say, it contains properly secured to it a spring or springs, as at 8 and 9, that are wound up or put under increasing tension as the curtain is unrolled, so that the shutter can be raised or lowered with little effort and shall remain at the point to which it is adjusted without the aid of securing devices. Such roller has at one end a stationary shaft 10 about which the drum of the roller turns, and at the other end a rotary shaft 11 secured to turn with the drum. These shafts are supported in suitable end brackets 12 and 13, respectively, as usual with such rollers. The rotary shaft 11 extends somewhat beyond the outer face proper of the end bracket in which it turns, and, as shown more particularly in Figs. 1 and 2, is furnished with a barrel 14 and a collar 15 between which, within the barrel is secured, as seen at $14^a$ and $15^a$, a volute spring 16. The spring 16 is to be kept normally wound up. The rotary shaft 11 is normally loose to turn within the hub of the barrel, and the rim of the latter is furnished with a number of lugs $14^b$, one of which at the proper moment is engaged by a lug $17^a$ on a lever 17, as hereinafter described. The collar 15 is held from turning by means of a dog lever 18 fulcrumed at one end at $18^a$, said lever being held in collar-engaging position by means of a rod 19 attached to the other end of said dog lever and releasably secured in the channel bar of the shutter as hereinafter described. The rotary shaft 11 has pinned to it, beyond the aforesaid barrel, a ratchet wheel 20, and the barrel has pivoted to its outer face, in the plane of the toothed rim of the ratchet, a pawl or dog 21 that is normally pressed by a spring 22 also on the outer face of the barrel. The spring 22 tends to press the pawl 21 into engagement with the ratchet teeth, but normally, or in the ordinary operation of the shutter, the point of the pawl is held out of the path of the teeth by a finger $21^a$ thereon that abuts against a lug $17^b$ on the lever 17. The construction of the lugs $17^a$ and $17^b$ is such that when the lever 17 is released and dropped, the finger $21^a$ escapes from the lug $17^b$ before the lug $14^b$ escapes from the lug $17^a$, so as to permit the engagement by the pressure of the spring, of the point of pawl 21 with the ratchet-wheel 20 before the release of the barrel 14 from the lever 17. When, therefore, the lever 17 is released, the spring 16 exerts its power through the barrel, the pawl, the ratchet on the rotary shaft, and shutter roller, and in a direction to cause the shutter to run down and close the opening for which it is installed. When the shutter is thus closed, it may be important, in order to permit the escape of persons in the building, that the shutter be easily raised, hence I provide means whereby the pressure of the spring 16 may be released and rendered inert and the ordinary balance between the curtain and the spring within the roller restored. In Figs. 1 and 4 the said means consists of the wire rod 19 bent to form a loop $19^a$ constituting a finger piece, and a hooking extension indicated at $19^b$ that passes through a hole in the curtain channel, so that the hook and rod 19 and consequently the dog lever 18 can be released either from the interior or the exterior of the building after the shutter has closed. Another form of dog-lever releasing device is shown in Figs. 5 and 6. In this instance the rod 19 has a bent lower end $19^c$ that is caught under the upper end of a latch $19^d$ pivotally mounted on the shutter channel and said latch $19^d$ being engaged by one arm of a horizontally-pivoted latch $19^e$. One arm of the latch lever $19^e$ is accessible from the interior of the building, while the other is accessible from the exterior, said arm passing through a suitable hole in the shutter channel.

The lever 17 is normally held up in position to latch the pawl 21 and the spring barrel 14 by means of a pendent lever 23 hung on the inclosing hood 24, said lever having a shoulder $23^a$ (see Fig. 4) on which the end of the lever 17 rests. The shoulder $23^a$ is held in lever-supporting position by means of a wire 25 attached to the lever 23 and to the end bracket at the opposite side of the window, said wire being made up of sections united by solder, as at $25^a$, fusible by a dangerous rise of temperature.

In Fig. 3 is illustrated a modification in which the dog lever 18 is omitted. When this modification is employed the inner end of the volute spring 16 is made fast to a fixed boss $13^a$ on the end bracket 13, and the spring should be wound to such a state of tension that it will just or quite exhaust its power shortly before or by the time the shutter reaches its completely-closing position, so that little effort will be required to raise the shutter a foot or two to permit the escape of persons from or access of persons to the interior of the building.

For winding up or placing the volute spring 16 under proper tension, the barrel 14 can be made with a number of holes $14^c$ into which a tool can be inserted for turning the barrel.

What I claim and desire to secure by Letters Patent is:

1. In combination with a counterbalanced shutter or curtain that is normally operative for raising and lowering, means for impelling the shutter or curtain to opening-closing position consisting of a spring actuated barrel with a dog thereon, means for normally retaining said dog inoperative to impel the shutter or curtain to opening-closing position and means operative by a dangerous rise of temperature for automatically releasing the dog to impel the shutter or curtain to opening-closing position.

2. In combination with a counterbalanced shutter or curtain that is normally operative for raising and lowering, means in connection therewith adapted to receive a dog or pawl, means for impelling the shutter or curtain to opening-closing position consisting of a spring actuated member carrying a dog or pawl said dog or pawl adapted to engage the said means to receive such member, means operative by a dangerous rise of temperature for normally retaining said dog or pawl inoperative to impel the shutter or curtain to opening-closing position, substantially as described.

3. In combination with a normally-operative counterbalanced shutter or curtain, means for disturbing said counterbalance and impelling the shutter or curtain to closing position, means for normally retaining said last-named means in inoperative condition adapted to be released for operation by a dangerous rise of temperature, and means for rendering said impelling means inert and restoring the counterbalanced condition after the shutter has reached closing position.

4. In combination with the rotary shaft of a shutter or curtain counterbalancing spring roller, a ratchet wheel fixed on said shaft, a barrel loose with reference to said shaft, a collar in which said shaft normally turns, a spring attached to said barrel and collar, a pawl on said barrel to engage said ratchet wheel, means to detain said barrel from rotation, means to detain said pawl disengaged from said ratchet wheel, means for releasing said pawl to engage the barrel and means for releasing said barrel adapted to be operated by a dangerous rise of temperature.

5. In combination with a rotary shaft of a shutter or curtain counterbalancing spring roller, a ratchet wheel fixed on said shaft, a barrel loose with reference to said shaft, a collar with reference to which said shaft normally turns, a spring attached to said barrel and collar, a pawl on said barrel to engage said ratchet wheel, means to detain said barrel from rotation, means to detain said pawl disengaged from said ratchet wheel and means for releasing said pawl to engage the ratchet, and means for releasing said barrel adapted to be operated by a dangerous rise of temperature, said releasing means adapted to release the pawl prior to the release of the barrel.

6. In combination with the rotary shaft of a shutter or curtain counterbalancing spring roller, a ratchet wheel fixed on said shaft, a barrel loose with reference to said shaft, a fixed collar with reference to which said shaft normally turns, a spring attached to said barrel and collar, a pawl on said barrel to engage said ratchet wheel, means to detain said barrel from rotation, means to detain said pawl disengaged from said ratchet wheel, and means for releasing said pawl to engage the ratchet and means for releasing said barrel adapted to be operated by a dangerous rise of temperature.

7. In combination with a rotary shaft of a shutter or curtain counterbalancing spring roller, a ratchet wheel fixed on said shaft, a barrel loose with reference to said shaft, a movable collar with reference to which said shaft normally turns, means for holding said collar from turning, a spring attached to said barrel and collar, a pawl on said barrel to engage said ratchet wheel, means to detain said barrel from rotation, means to detain said pawl disengaged from said ratchet wheel, and means for releasing said pawl to engage the ratchet wheel and means for releasing said barrel adapted to be operated by a dangerous rise of temperature.

8. In combination with the rotary shaft of a shutter or curtain counterbalancing spring roller, a ratchet wheel fixed on said shaft, a barrel loose with reference to said shaft, a movable collar with reference to which said shaft normally turns, means for releasably holding said collar from turning, said means being accessible for operation at the lower portion of the opening in which the shutter or curtain is installed, a spring attached to said barrel and collar, a pawl on said barrel to engage said ratchet wheel, means to detain said barrel from rotation means to detain said pawl disengaged from said ratchet wheel, and means for releasing said pawl to engage the ratchet wheel, and means for releasing said barrel adapted to be operated by a dangerous rise of temperature.

9. In combination with the rotary shaft of a shutter or curtain counterbalancing spring roller, a ratchet wheel fixed on said shaft, a barrel loose with reference to said shaft, a movable collar with reference to which said shaft normally turns, means for releasably holding said collar from turning, said means being accessible for operation from either the interior or exterior of the building after the shutter or curtain is closed, and at the lower portion of the opening in which the shutter or curtain is installed, a spring attached to said barrel and collar, a pawl on said barrel to engage said ratchet wheel, means to detain said barrel from rotation, means to detain said pawl disengaged from said ratchet wheel, and means for releasing said pawl to engage the ratchet wheel and means for releasing said barrel adapted to be operated by a dangerous rise of temperature.

10. In means of the character set forth, the combination of a roller, a shutter connected therewith, a clutch-member connected with said roller, a normally-tensioned spring, a clutch-member connected with said spring and normally out of operative engagement with said first-named clutch-member, and restraining means for said spring equipped with a fusible member.

11. In means of the character set forth, the combination of a roller, a shutter connected therewith, a clutch member connected with said roller, a normally tensioned spring, a clutch-member connected with said spring and normally out of operative engagement with said first-named clutch member, restraining means for said spring equipped with a fusible member, and means for causing the engagement of said clutch members prior to the release of the spring.

12. In means of the character set forth, the combination of a roller, a shutter connected therewith, a clutch member connected with said roller, a normally tensioned spring, a clutch member connected with said spring and normally out of operative engagement with said first-named clutch member, thermally controlled restraining means for said spring, and means for causing the engagement of said clutch members prior to the release of the spring.

EDWARD H. McCLOUD.

Witnesses:

BENJAMIN FINCKEL,
GEORGE M. FINCKEL.